J. HOUPT.

Compound Condensing Apparatus for Steam-Engines.

No. 8,670. Reissued April 15, 1879.

Witnesses:

A. P. Grant,

H. F. Kischer

Inventor:

John Houpt, by John A. Friedersheim

ATTORNEY.

N. PETERS, PHOTO-LITHOGRAPHER, WASHINGTON, D. C.

UNITED STATES PATENT OFFICE.

JOHN HOUPT, OF SPRINGTOWN, PENNSYLVANIA.

IMPROVEMENT IN COMPOUND CONDENSING APPARATUS FOR STEAM-ENGINES.

Specification forming part of Letters Patent No. 196,902, dated November 6, 1877; Reissue No. 8,670, dated April 15, 1879; application filed December 19, 1878.

*To all whom it may concern:*

Be it known that I, JOHN HOUPT, of Springtown, in the county of Bucks and State of Pennsylvania, have invented a new and useful Improvement in Compound Condensing Apparatus for Steam-Engines, which improvement is fully set forth in the following specification and accompanying drawings, in which—

Figure 1:
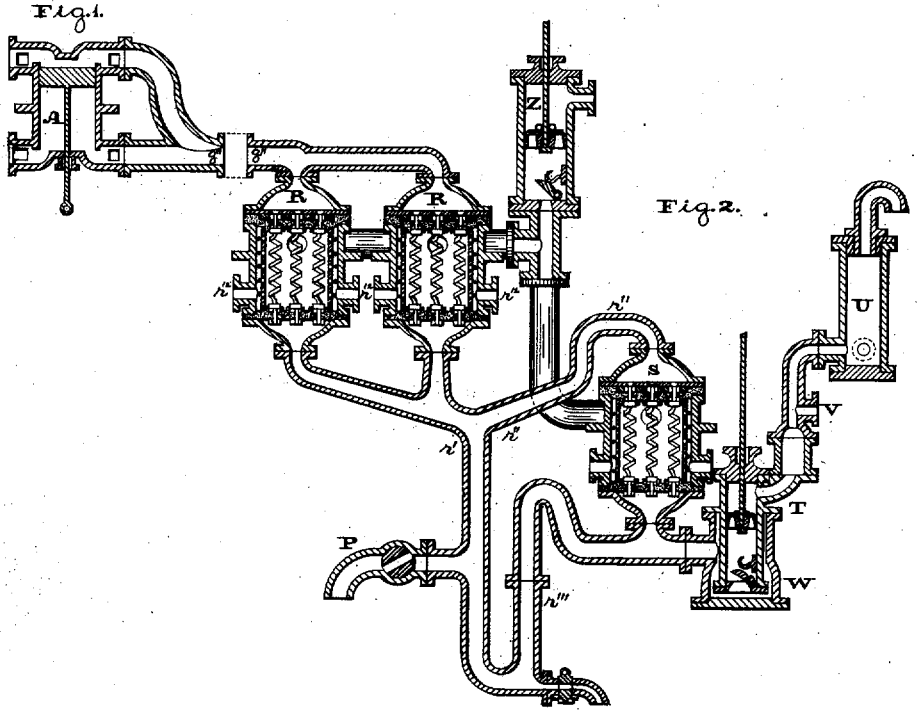
Figure 3:
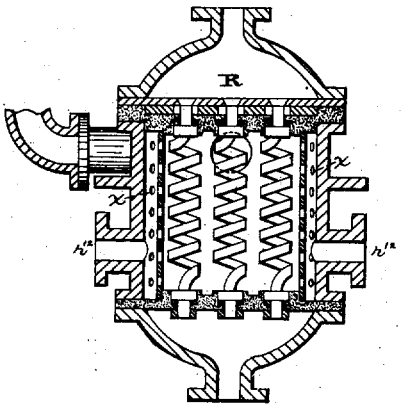
Figure 4:
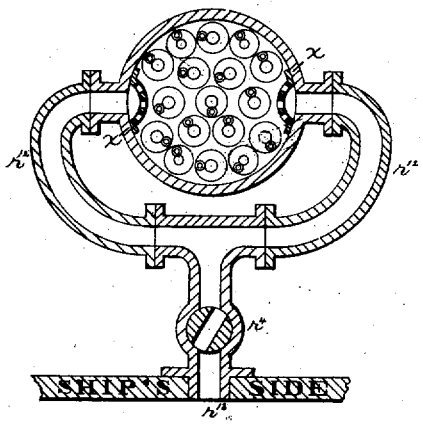

Figure 1 is a central section of a steam-cylinder and connected pipes. Fig. 2 is a vertical section of the apparatus embodying my invention. Fig. 3 is an enlarged view of a portion of Fig. 2. Fig. 4 is a horizontal section thereof.

Similar letters of reference indicate corresponding parts in the several figures.

My invention relates to improvements in compound condensing apparatus for steam-engines, for which Letters Patent of the United States No. 168,901 were granted to me on the 19th day of October, 1875.

The present improvements consist of primary condenser or moderator, by means of which the exhaust-steam from the steam-cylinder is cooled to a temperature a little below that of boiling water, (under a partial vacuum,) thereby moderating the temperature and rush of the exhaust-steam from the steam-cylinder on its way toward a secondary condenser, and by retaining a comparatively low temperature in the said secondary condenser, so as to produce a good vacuum in front of the steam-piston, and also at the same time be enabled to save a higher temperature in the steam-cylinder than can be practically afforded by the ordinary condensing steam-engine, substantially as will be more fully described hereinafter.

The hot water of condensation from the primary condensing-case drops down and passes off through pipes into the hot-well below, and is drawn off from thence by an air-pump, and forced into another hot-well for supplying the steam-boilers with hot fresh water. Combined therewith is an attachment to a force-pump, so located that a large portion of the hot water of condensation from the primary condensing-case may be drawn off and forced directly into the hot-well or into the steam-boilers without allowing it to pass through or to interfere with the air-pump, the object whereof is to supply the steam-boilers with hot (fresh) water at a higher temperature than could be afforded by the ordinary condenser, and thereby to economize fuel.

The hot vapor from the primary condenser is drawn off by the action of the air-pump into the secondary condenser, and it is there condensed to save the remnant of fresh water for supplying the steam-boilers, and to produce the desired vacuum in front of the steam-piston.

Referring to the drawings, A represents the steam-cylinder, exhaust-pipes of which communicate directly with primary surface-condensing cases R R, with which are connected pipes $r'$ $r'''$, communicating with the hot-well W below.

S represents the secondary surface-condenser or "save-all," whose upper portion communicates with the pipe $r'$ by means of a branch pipe, $r''$, and its lower portion with the pipe $r'''$, whereby it will be seen that the primary condensers are directly intermediate of the steam-cylinder and secondary condenser. T represents the air-pump; U, the hot-well; V, the hot-water-supply pipe for boilers, and Z the circulating-pump.

In the condenser-cases there are openings $r^{12}$ $r^{12}$, for the entrance of cold circulating water into the said cases, and within the latter there are curved perforated deflectors X X, secured opposite to the inlet-opening, and adapted for a general distribution of the circulating water among the spirally-coiled surface-condensing tubes, to which, however, I do not confine myself, as some other well-known form of condensers may answer as well, if not better, for condensing the exhaust-steam, and for discharging the hot water and vapor more promptly from the primary condenser, thus facilitating the escape of the exhaust-steam from the steam-cylinder—as, for instance, in a land or fresh-water low-pressure steam-engine, I might apply a comparatively small jet-condenser in the place of the secondary surface-condenser, which is represented at S in the accompanying drawings, thereby to facilitate the escape of the hot water and vapor more promptly from the primary condenser, substantially as aforesaid.

In Fig. 4, $r^{13}$ represents a pipe, which communicates with the inlets or pipes $r^{12}$ $r^{12}$, whereby cold circulating water is admitted into the condensing-cases, for purposes of condensation of the exhaust-steam, the supply being regulated by a cock, $r^4$, suitably applied.

It will be seen that as the exhaust-steam enters the primary condensing-cases R R it will be cooled to a temperature below that of boiling water, (under a partial vacuum,) and the hot water of condensation drops and passes off through the pipes $r'$ $r'''$ into the hot-well W, and it is drawn from thence by the air-pump T, and forced into the hot-well U, for supplying the steam-boilers with hot fresh water.

Attached to the pipe $r'$, intermediate of said pipe and the pipe $r'''$, there is a connection, P, for a force-pump, (not illustrated in the drawings,) the object of which is as follows, viz: When it is desired to supply the steam-boilers with hot fresh water at a higher temperature than could be afforded by the ordinary condenser, and thus also economize fuel, the cock of the attachment P is opened, and the force-pump connected thereto is operated, whereby a large portion of the hot water of condensation from the primary condensing-case R may be drawn off and forced directly into the hot-well U, or into the steam-boilers, without allowing it to pass through or interfere with the air-pump T. The hot vapor from the primary condensing-case R will be drawn from the pipe $r'$, by the action of the air-pump T, through the pipe $r''$ into the secondary condenser or save-all S, and there be condensed to save the remnant of fresh water for supplying the steam-boilers, and to produce the desired vacuum in front of the steam-piston.

By retaining a moderately high temperature in the primary condenser R, directly intermediate of the steam-cylinder A and the secondary condenser S, and receiving the full exhaust, I check the cooling effects of the said secondary condenser S from striking back into the steam-cylinder A, and prevent, in a great measure, the condensation of the steam as it enters at each fresh charge into the steam-cylinder. This economizes the power of the steam acting on the steam-piston when the engine is regularly at work.

When the low-pressure steam-engine is required to work at a light pressure of steam, as is frequently the case, there will then be less cooling capacity required by the condenser than when the engine is properly at work with a regular pressure of steam acting on the steam-piston. I therefore construct the primary condenser of my compound condensing apparatus for steam-engines with a plurality of comparatively small condensing-cases connected with the exhaust-steam tube of the steam-engine. These may be from one to six or more in number, (instead of two, as represented at R R, Fig. 2, of the accompanying drawings,) according to the magnitude of the works. Any desired number of said small cases may then be throttled off by any suitable arrangement of the throttle-valve or stop-cocks, so as to regulate the quantity of cold circulating water in the remainder of the cases required to reduce the temperature of the exhaust-steam within them to a point a little below boiling water. The water of condensation will then be returned to the steam-boilers at a higher temperature than can be afforded by the ordinary condenser and at the expenditure of less fuel.

Having thus described my invention in its various forms, what I claim as new, and desire to secure by Letters Patent, is—

1. The primary condenser or moderator R, connected directly intermediate of the steam-cylinder A and secondary condenser S, thereby to check the cooling effects of the secondary condenser S from striking back into the steam-cylinder A, substantially as and for the purpose hereinbefore set forth and described.

2. The primary condenser R and secondary condenser S, in combination with the pipes $r'$ $r'''$ and connection P, substantially as and for the purpose hereinbefore set forth and described.

3. The primary condenser R and secondary condenser S, in combination with the pipes $r'$, $r''$, and $r'''$, and with the connection P intermediate of the pipes $r'$ and $r'''$, substantially as and for the purpose hereinbefore set forth and described.

JOHN HOUPT.

Witnesses:
W. F. WITTE,
JOHN A. WIEDERSHEIM.